United States Patent [19]

Condon

[11] Patent Number: 4,464,028

[45] Date of Patent: Aug. 7, 1984

[54] MOTION PICTURE SYSTEM FOR SINGLE STRIP 3-D FILMING

[76] Inventor: Chris J. Condon, 16606 Oakview Dr., Encino, Calif. 91436

[21] Appl. No.: 322,261

[22] Filed: Nov. 17, 1981

[51] Int. Cl.³ ............................................ G03B 35/02
[52] U.S. Cl. ...................................... 352/65; 350/130
[58] Field of Search ........................... 352/60, 65, 140; 350/130; 354/270

[56] References Cited

U.S. PATENT DOCUMENTS

| | | | |
|---|---|---|---|
| 1,512,785 | 10/1924 | Mittasch | 354/270 |
| 2,015,261 | 9/1935 | Eckler | 354/270 |
| 2,380,216 | 7/1945 | Carter | 354/270 |
| 2,463,311 | 3/1949 | Ramsdell | 352/60 |
| 3,189,915 | 6/1965 | Tondreau | 352/60 |
| 3,363,966 | 1/1968 | Hoch | 352/60 |
| 3,631,786 | 1/1972 | Crapsey | 352/140 |
| 3,825,328 | 7/1974 | Hoch | 352/60 |

FOREIGN PATENT DOCUMENTS

| | | | |
|---|---|---|---|
| 810592 | 3/1937 | France | 352/60 |
| 874716 | 5/1942 | France | 350/130 |

OTHER PUBLICATIONS

The British Journal of Photography, Dec. 12, 1952, p. 615.

Primary Examiner—Monroe H. Hayes
Attorney, Agent, or Firm—Allan M. Shapiro

[57] ABSTRACT

Lens system for 3-D filming comprises a pair of negative achromatic lenses horizontally spaced substantially on the interpupillary distance. Behind these front lenses, a pair of tilted rhomboid prisms fold the optical paths to be closely positioned one above the other. On these paths, rear lens systems focus the images onto the film plane in upper and lower frame halves. The forward negative achromatic lenses are adjustable fore and aft for focus adjustment, and the rear lens systems are laterally adjustable for convergence control.

14 Claims, 13 Drawing Figures

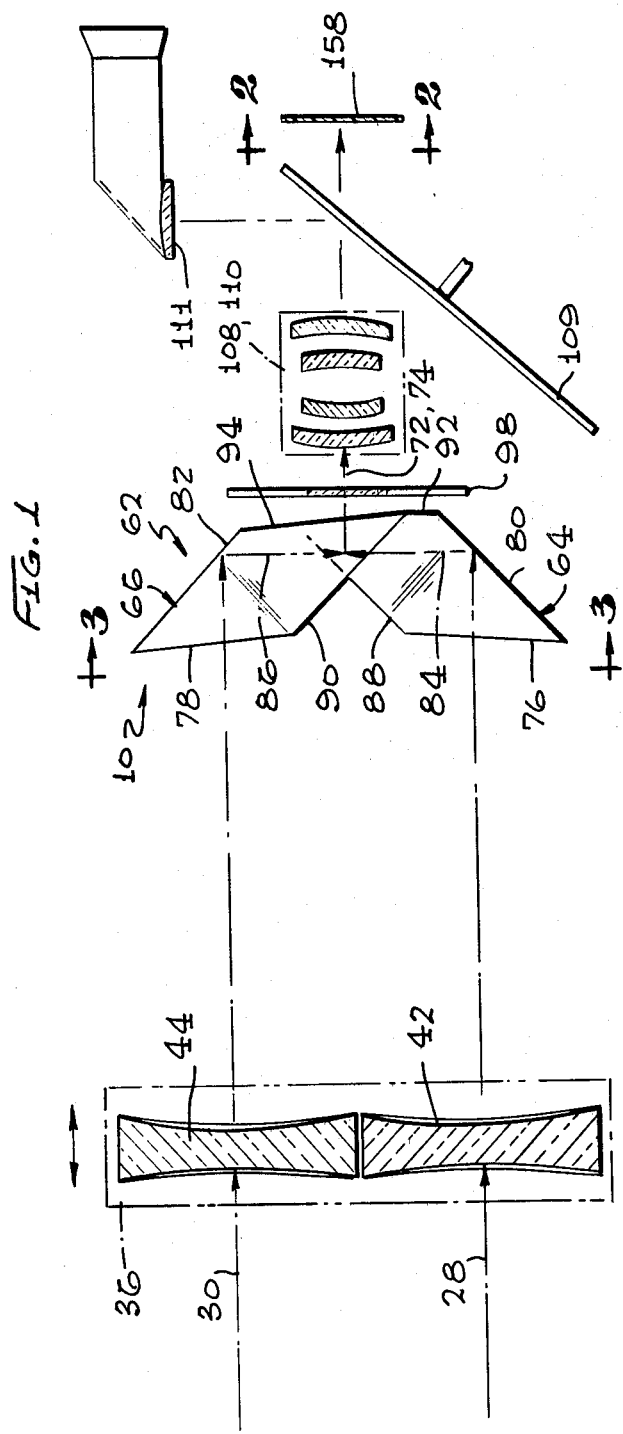
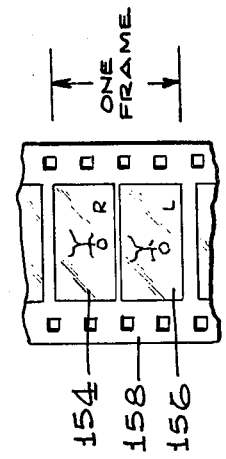
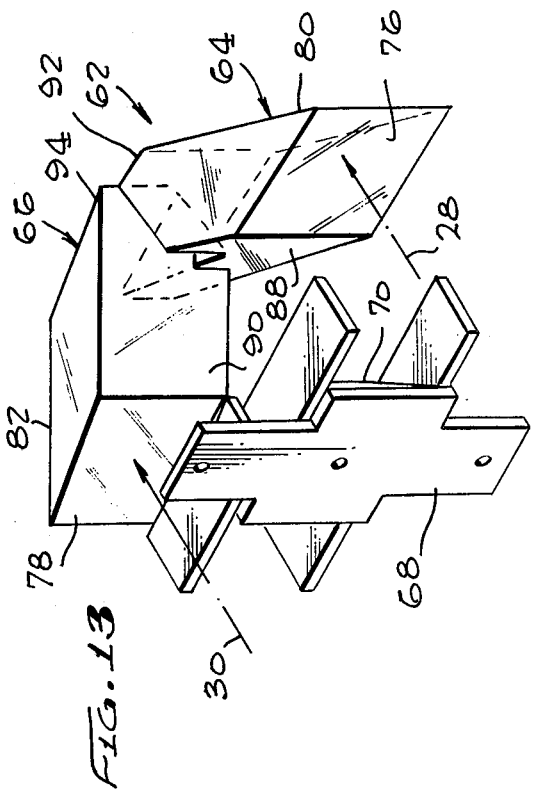

FIG. 6
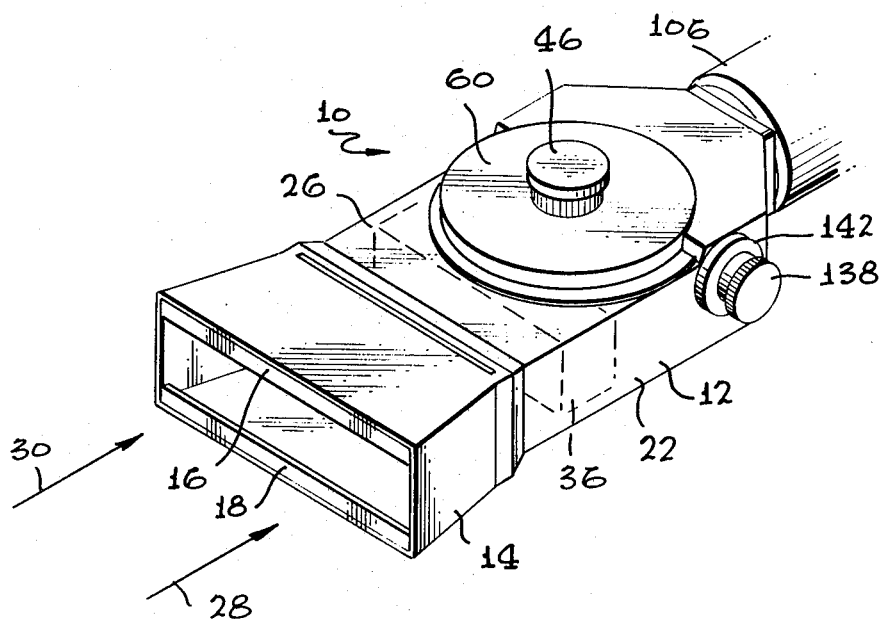
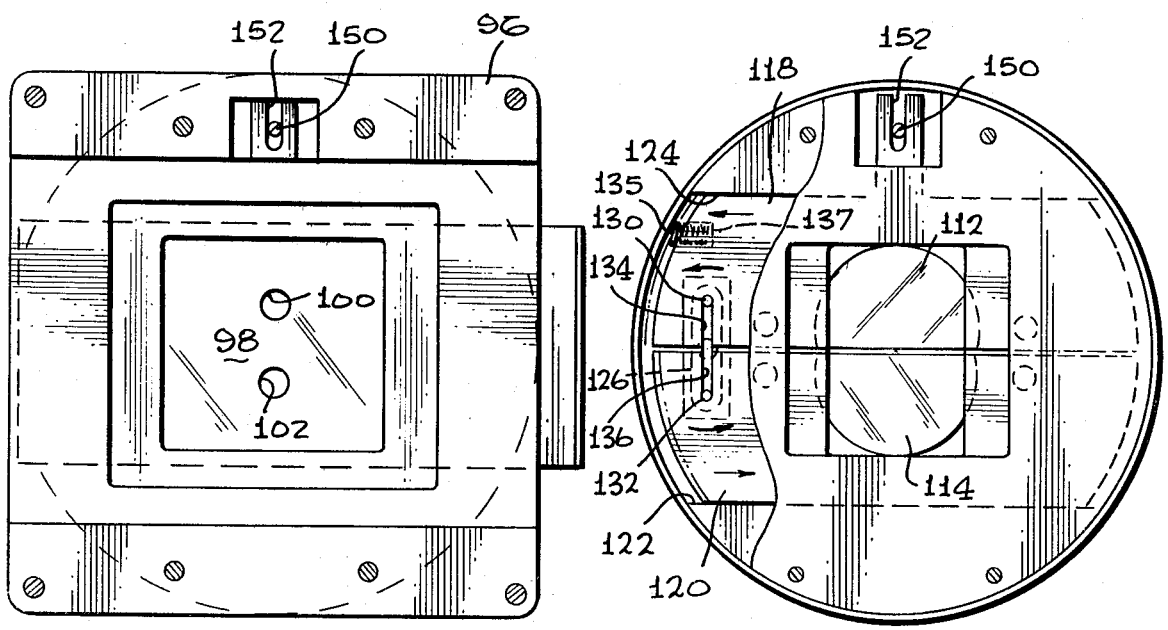
FIG. 9      FIG. 10

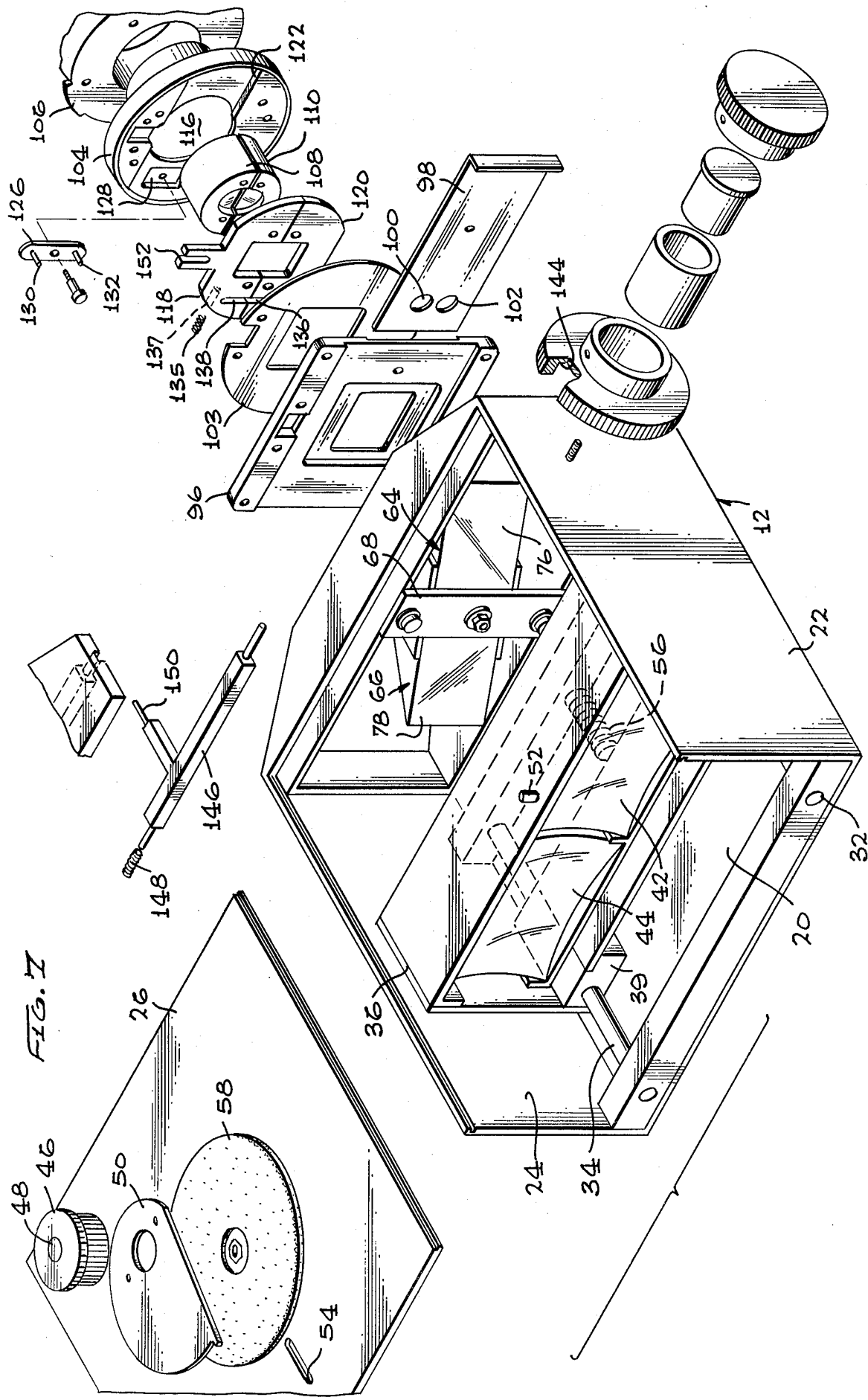

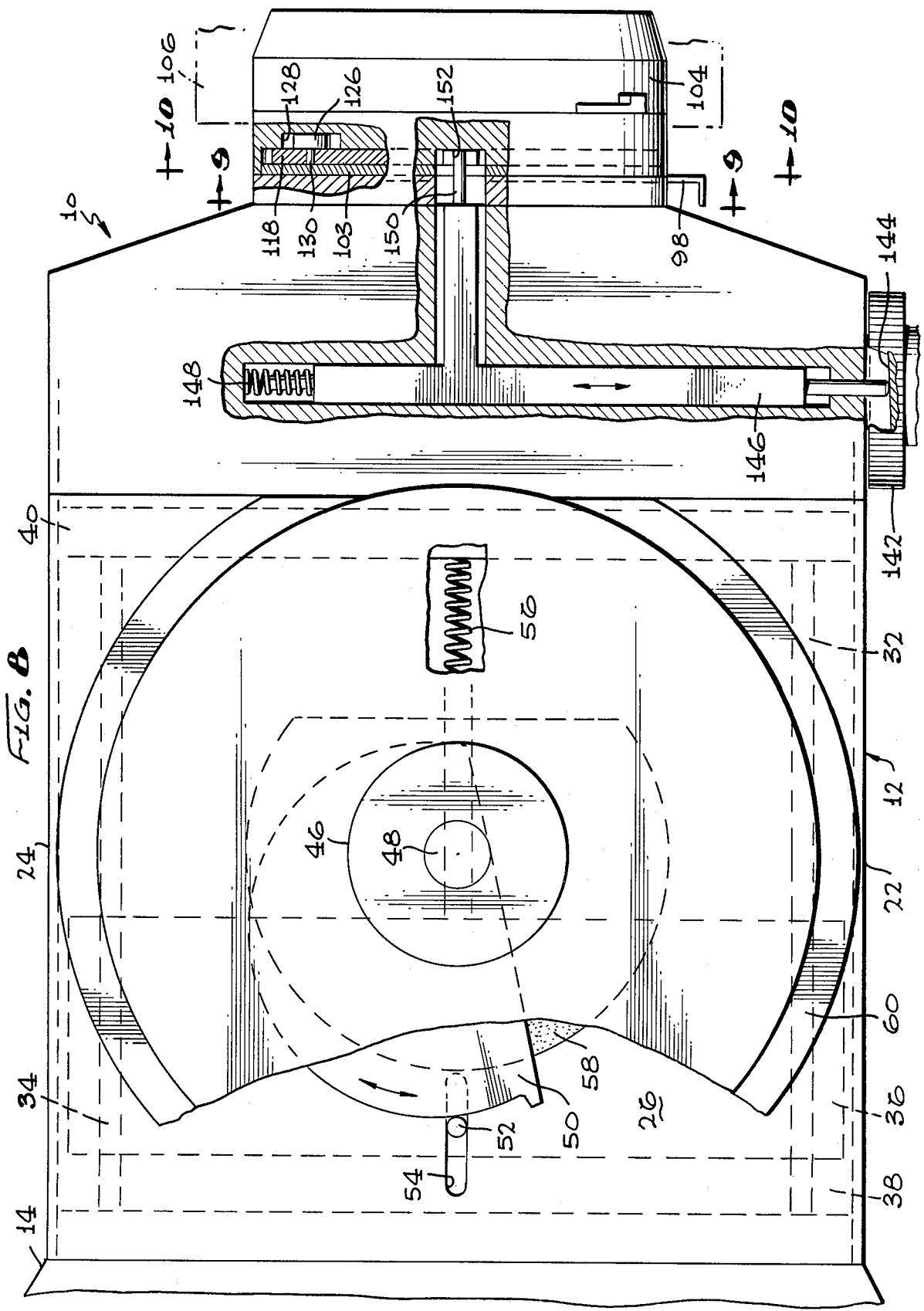

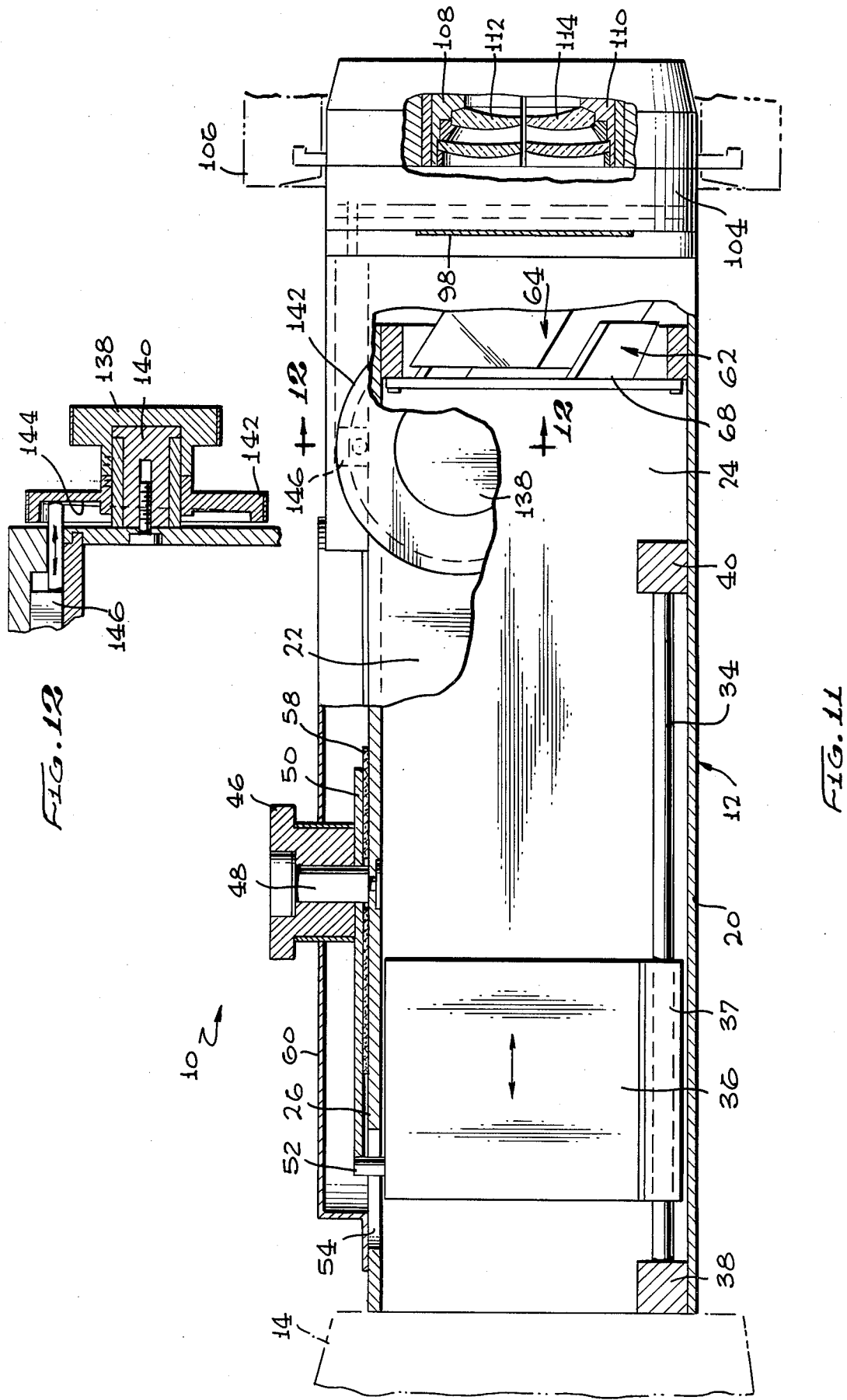

MOTION PICTURE SYSTEM FOR SINGLE STRIP 3-D FILMING

BACKGROUND OF THE INVENTION

This invention is directed to a lens system particularly useful in motion picture filming of single strip 3-dimensional photographs.

Stereoscopic motion pictures require simultaneous exposure of left and right photographic images. These spaced images are later projected and keyed to each eye to provide binocular stereoscopy. An initial approach was to utilize two side-by-side movie cameras to expose separate films. This produced problems in maintaining synchronization, illumination and registration of the projected images, and the results impaired the 3-dimensional quality of the projected images. Thereupon, systems were developed that exposed the pair of left and right images on a single film strip. Side-by-side relationship of these images was not completely satisfactory and it has been considered preferable to expose the left and right images vertically with respect to each other on the film strip. Several complex optical systems have been developed in an attempt to satisfactorily accomplish the objective of satisfactory stereoscopic motion picture photography and projection. Such systems are found in R. V. Bernier U.S. Pat. No. 3,531,191, W. C. Hoch U.S. Pat. No. 3,825,328 and A. M. Marks, et al. U.S. Pat. No. 3,990,087.

These patents are burdened with complicated relay lens systems and complicated or special prisms for the folding optics. For example, the Bernier patent employs very complicated prisms and the configuration does not allow its use with modern reflex viewing motion picture cameras. In the Marks, et al. patent, the employment of a single final lens system to focus the image at the focal plane, using polarizing plates to minimize image bleed-over, causes the system to lose about 2½ f stops of light with subsequent loss of desirable depth of field. The structure of the Hoch patent is similar in some respects and also has a complicated relay system. Therefore, there is need for a lens system particularly useful for motion picture filming for 3-D on a single film strip.

SUMMARY OF THE INVENTION

In order to aid in the understanding of this invention, it can be stated in essentially summary form that it is directed to a motion picture system for single strip 3-D filming wherein left and right negative achromatic lenses are laterally spaced as the front optical element. Tilted rhomboid prisms convert the laterally spaced subject axes into closely vertically spaced image axes. A separate rear lens system on each of these vertically spaced image axes focuses upper and lower images on the film plane. Adjustment of the negative achromatic lenses along the image axis provides focusing while lateral adjustment of the rear lens systems controls convergence.

It is, thus an object of this invention to provide a motion picture system for single lens 3-D filming, particularly as a lens system for retrofit onto existing cameras.

It is another object to provide a single strip 3-D lens system where left and right incoming images are transposed to an above and below position by employment of conventional rhomboid type prisms.

It is a further object to provide a lens system for 3-D filming wherein the unique lens system accomplishes focusing by the forward position of the negative achromatic lenses as they are adjusted along the image axis.

It is a further object to provide a negative achromatic lens system wherein the focal length of the optical system changes as the focus changes so that, for focusing on closer subjects, the focal lengths become shorter, which increases the angle of view thereby enhancing stereoscopic effect by permitting the subject to avoid touching the edge of the screen masking.

It is a further object to provide such a motion picture lens system for single strip 3-D filming wherein the front negative optical retrofocus lenses can be provided with different curvatures to provide different lens systems for different angles of view, without basic change in the balance of the optical system. It is also possible to include in the front negative optical system an arrangement of weak positive and negative intermovable elements so that a variable focal length or zoom effect can be achieved.

It is a further object to provide a lens system for 3-D filming which can be employed for still pictures, such as positive slides for still projection.

It is a further object to provide a lens system for single strip 3-D filming wherein the focus and convergence controls are positioned for access from either side of the camera.

It is another object to provide an internal aperture stop between the rhomboid prismatic system and the rear lens system wherein the aperture stop can carry thereon filters to control exposure and color correction.

Other features of the present invention which are believed to be novel are set forth with particularlity in the appended claims. The present invention, both as to its organization and manner of operation, together with further objects and advantages thereof, may be best understood by reference to the following description, taken in conjunction with the accompanying drawings.

BRIEF DESCRIPTION OF THE DRAWINGS

FIG. 1 is a schematic plan view of the optical system of the motion picture system for single strip 3-D filming in accordance with this invention.

FIG. 2 is a view of a portion of the film strip, as seen generally along the line 2—2 of FIG. 1.

FIG. 6 is an isometric view of the exterior structure of the motion picture system for single strip 3-D filming in accordance with this invention.

FIG. 7 is an exploded isometric view thereof, with parts broken away and parts taken in section.

FIG. 8 is a plan view of the structure of FIG. 6, with parts broken away and parts taken in section.

FIG. 9 is an elevational view of the aperture stop.

FIG. 10 is an elevational view of the rear lens system, with parts broken away and parts taken in section.

FIG. 11 is a side-elevational view of the structure of FIG. 6, with parts broken away and parts taken in section.

FIG. 12 is a section taken generally along the line 12—12 of FIG. 11.

FIG. 13 is an isometric detail of the prism mounting structure.

DESCRIPTION OF THE PREFERRED EMBODIMENT

Figure 3:
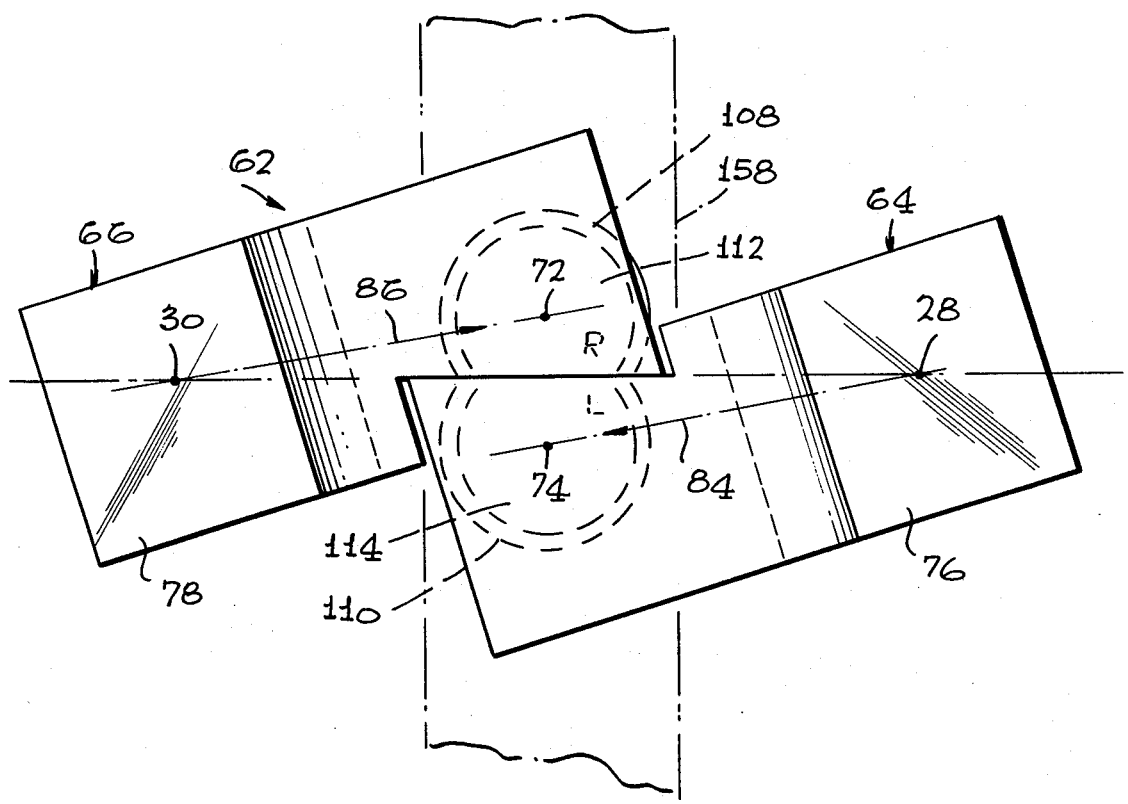
FIG. 3 is a view looking at the front of the prisms, as seen generally along line 3—3 of FIG. 1.
Figure 4:
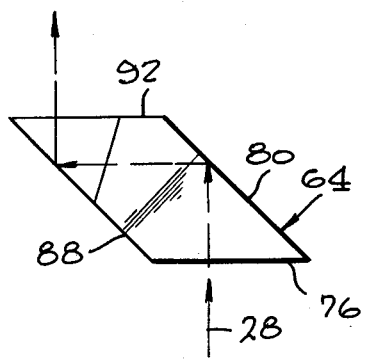
FIG. 4 is a plan view of the left prism.
Figure 5:
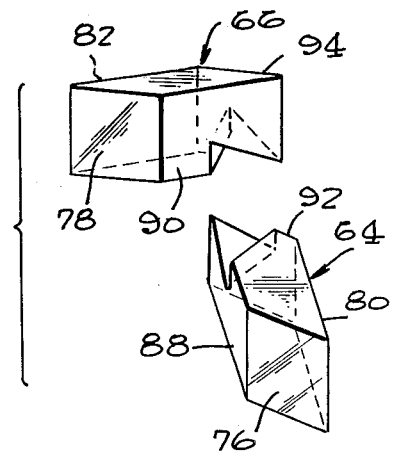
FIG. 5 is an exploded isometric view of the mating pair of rhomboid prisms.

The system 10 of this invention for single strip 3-D filming, particularly useful for motion picture filming, is indicated in FIGS. 1, 6, 7, 8 and 11. System 10 has a main housing 12. Considering the system in a direction from the subject to the film plane, main housing 12 carries on its front end lens shade 14 in the form of an open front matte box. In addition to serving the usual lens shading function, the lens shade 14 has upper and lower blades 16 and 18 to minimize extraneous light, because extraneous light in a stereoptic 3-D system can be diverted into the other image axis causing reduction in image sharpness. Blades 16 and 18 are, thus, sized to prevent light from outside of the acceptable image angle from reaching the front lenses.

Main housing 12 has a bottom 20, left and right sides 22 and 24, and top 26. As seen in FIGS. 6, 7, 8 and 9, these parts form a rectangular, hollow housing structure. The image axes, outside of the prismatic structure as hereinafter described, are parallel and are arranged in the front-to-back direction. Left and right image axes 28 and 30 are illustrated in FIG. 1. These left and right image axes are spaced apart about 65 millimeters, the usual interpupillary distance in humans. As is seen in FIGS. 7 and 11, left and right rails 32 and 34 are mounted on front and rear blocks 38 and 40 which are secured to bottom 20 of the main housing. These rails are directed parallel to the image axis. Lens housing 36 is mounted on left and right guides 37 and 39, see FIGS. 7 and 11, which slidingly embrace rails 32 and 34. Lens housing 36, thus, can slide smoothly on a path parallel to the image axis.

Left and right biconcave negative achromatic lenses 42 and 44 are mounted in lens housing 36 with the lens axes on the left and right image axes. The lenses 42 and 44 may be several cemented-together lens elements to achieve acromatic refraction in a conventional manner and are net negative lenses in order to allow focusing of the system by moving of the lens housing 36 on its rails. With this system, focusing can be completely accomplished with only movement of the lens housing 36 with its negative achromatic lenses, comprising the front optical assembly, along the image axis. The lenses 42 and 44 include multiple lens elements. Furthermore, the shape of these lenses can be configured so that the proportion of height to width of the image at the film plane may be different than the proportion on the subject. The employment of the biconcave negative achromatic lenses for retrofocus provides the desirable wide angle towards the subject. Furthermore, the negative elements reduce the focal length of the rear lens system which causes the rear lens system to be positioned more forwardly even though the focal length is shorter. This positioning farther from the film plane 158 permits the rear lens system to clear the angled revolving reflex mirror shutter 109 which reflects the images to the cameraman's viewing lens 111, the latter elements being in the camera.

Also, the negative retrofocus lens system has the advantage that, as the lens is focused to a near subject, the focal length of the system becomes shorter, thereby increasing the angle of view which, in turn, is desirable for most special effects or 3-dimensional photography.

The position of lens housing 36 along its rails is controlled by focusing knob 46 which rotates on post 48 which is mounted in top 26 of the main housing. Focusing knob 46 carries spiral cam 50 thereon. Cam follower post 52 is mounted on the top of lens housing 36 and extends upward through slot 54 in the top 26 of main housing 12. In this way, rotation of focusing knob 46 moves lens housing 36 and its negative achromatic lenses 42 and 44 in a forward direction. Spring 56 urges lens housing 36 in the rearward direction to maintain contact of cam follower post 52 with its cam 50. Focusing knob 46 can be calibrated, as desired.

Friction pad 58, under cam 50 and on top 26, provides the friction to provide the proper feel for focusing knob 46 and to hold the knob in place after it has been set. Cam cover 60 engages over cam 50 to cover slot 54. The junction between knob 46 and cover 60 can be closed with felt.

FIGS. 1, 5, 7 and 13 best show the prism assembly 62. The purpose of the prism assembly is to bring the laterally spaced axes 28 and 30 close enough together to be recorded on a single strip of film, and to position them so that at the film plane the images are above and below each other. Prism assembly 62 comprises left and right rhomboid prisms 64 and 66 together with mounting bracket 68. Mounting bracket 68 has a shaped clamp 70 which embraces both prisms and clamps them together. In FIG. 13, the bracket 68 is illustrated as having a V-shaped face which engages between the two prisms to maintain them in proper angular relationship. The bracket is mounted on a strap which secures to main housing 12. The bracket is rotatable on the strap so that the prisms can be angularly oriented.

Behind the prisms, the optical axes are also spaced from each other. Upper axis 72 and lower axis 74 are illustrated in FIG. 3. The axes 72 and 74 provide image paths which are parallel to each other, with upper axis 72 directly above the lower axis 74. The spacing between axes 72 and 74 is one-half frame, as shown in FIG. 2. FIGS. 1, 4, 5 and 13 illustrate that prisms 64 and 66 have faces 76 and 78 on the axes 28 and 30. Rear surfaces 80 and 82 internally reflect the image paths towards each other along paths 84 and 86. Since the faces 80 and 82 are at 45 degrees, the paths 84 and 86 are normal to paths 28 and 30.

Prism faces 88 and 90 are respectively parallel to faces 80 and 82 and reflect the image paths 84 and 86 onto axes 74 and 72, respectively. The prisms are rotated, as is seen in FIG. 3, so that the axes 72 and 74 of the image paths are spaced one above the other, as previously described, and are parallel to each other. This is a simple prismatic arrangement which provides the necessary optical alignment without custom grinding of the components. As illustrated in FIGS. 3, 4, 5 and 13, the large rhomboid prisms are notched adjacent the rear faces 92 and 94 so that they can overlap into the above and below arrangement.

Behind the prism mounting is aperture stop holder 96, see FIGS. 7 and 9. In order to control the amount of light at the film plane, aperture plate 98 containing apertures apertures 100 and 102 is slid into the aperture stop holder. Apertures 100 and 102 are selected in accordance with the amount of light on the subject and the film sensitivity. Apertures 100 and 102 are on the axes 72 and 74. Furthermore, aperture plate 98 can carry the gelatin color control filters such as are often employed in color motion picture photography.

Spacer 104 is mounted on the rear of aperture stop holder 96. Rear optics housing 104 directly mounts onto the camera mounting 106 so that the entire system is secured on the front of the camera. Rear optics housing 104 carries upper and lower lens housings 108 and 110 which respectively carry upper and lower lenses 112 and 114. The lens housings 108 and 110 fit into a pocket 116 in rear optics housing 104. Lenses 112 and 114 are nominally one above the other, directly on the optical axes 72 and 74. However, by moving them laterally with respect to each other, the convergence can be controlled. Convergence controls the appearance of depth in relationship to the projection screen plane in a reproduced stereo-optic projection. Therefore, lateral adjustment of these lenses with respect to each other to provide correct depth or to provide special effects is desirable. This movement is accomplished without any vertical displacement of the image.

In order to accomplish this adjustment, upper and lower lens housings 108 and 110 are respectively mounted on upper convergence slides 118 and 120. As is seen in FIGS. 7 and 10, the convergence slides fit within the face of rear optics housing 104 and slide against horizontally oriented shoulders 122 and 124. In order to maintain the two conveyor slides 118 and 120 related to each other, link 126 (see FIGS. 7, 8 and 10) is pivoted in pocket 128 and carries control pins 130 and 132 thereon. These control pins engage in slots 134 and 136 in the upper and lower convergence slides 118 and 120, see FIGS. 7 and 10. Thus, when upper slide 118 moves to the right (looking forward), lower slide 120 moves to the left. A spring 135 in slot 137 in slide 118 bears against the inner wall of housing 104 to bias slide 118 to the left (looking forward) and thus also bias slide 120 to the right.

External control of convergence is accomplished by convergence control knob 138, see FIGS. 6, 7 and 11. Convergence control knob 138 is pivoted in pin 140 and is locked to dial 142, see also FIG. 8. Dial 142 may be calibrated and, on its inside surface, carries axial cam ramp 144. Cam follower 146 is mounted for transverse motion on the top of housing 12 and is loaded by spring 148, see also FIG. 8, to follow the cam. Finger 150 extends rearwardly in openings in aperture stop holder 96 and in spacer 103 to engage in slot 152 in a portion of upper conveyor slide 118, as is also shown in FIG. 8. In this way, rotation of convergence control knob 138 moves upper and lower lens housings 108 and 110 laterally relative to each other, thus carrying the upper and lower lenses 112 and 114 in the lateral direction to control convergence. Movement of the lenses changes the optical path to change the offset of the images with respect to each other.

FIG. 2 shows the upper image 154 and the lower image 156 positioned within one frame space on film 158. By small lateral adjustments of these upper and lower images, as seen respectively by the right and left eye, the appearance of depth or 3-dimensional effect in the reprojective system is enhanced. The convergence conrol knob 138 is directly accessible to the cameraman so that he can adjust convergence in accordance with the film director's requirements.

This invention has been described in its presently contemplated best mode, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. An optical system for attachment to a motion picture camera for 3-D motion picture filming comprising:
   a system housing having a front and having first and second laterally spaced optical axes which lie substantially in a plane and extend from the front of said housing for directing at a subject, said housing having a rear, mounting means on the rear of said housing for mounting said housing on a camera;
   first and second laterally spaced negative acromatic lenses on said axes, a lens housing, said first and second laterally spaced acromatic lenses being mounted on said lens housing, said lens housing being movably mounted on said system housing;
   first and second rhomboid prisms, said first rhomboid prism having a face on said first laterally spaced axis and said second rhomboid prism having a face on said second laterally spaced axis, said first and second rhomboid prisms respectively having rearwardly directed faces positioned one above the other to define upper and lower image paths, said rhomboid prisms being notched adjacent each other to form adjacent notch faces on each prism, said notch faces lying substantially on the plane of said optical axes, said first and second laterally spaced negative acromatic lenses being the only refractive optical elements between the subject being filmed and said prisms; and
   upper and lower rear lens systems on said upper and lower image paths for focusing upper and lower images onto the film plane of a camera.

2. The system of claim 1 wherein
   said lens housing and said system housing have interengaging guides thereon directed parallel to said axes so that said lens housing and said negative lenses therein may be moved towards and away from said camera mounting means for focusing an object onto a film plane in a camera.

3. The system of claim 2 wherein a cam is positioned for engagement with said lens housing and a focus control knob is mounted on said main housing for engagement thereon so that control of said focus knob controls cam position to control the position of said lens housing within said main housing for focus control.

4. An optical system for attachment to a motion picture camera for 3-D motion picture filming comprising:
   a system housing having a front and having first and second laterally spaced optical axes which lie substantially in a plane and extend from the front of said housing for directing at a subject, said housing having a rear, mounting means on the rear of said housing for mounting said housing on a camera;
   first and second laterally spaced negative acromatic lenses on said axes, a lens housing, said first and second laterally spaced acromatic lenses being mounted on said lens housing, said lens housing being movably mounted on said system housing;
   first and second rhomboid prisms, said first and second rhomboid prisms being regular rhomboid prisms having forwardly directed faces respectively on said first and second optical axes, rearwardly directed faces parallel thereto and 45 degree directed prism faces, said prisms being tilted so that the laterally spaced lens axes become above- and below-spaced image paths, said rhomboid prisms being notched adjacent each other to form adjacent notch faces on each prism, said notch faces lying substantially on the plane of said optical axes, said first and second laterally spaced negative acromatic lenses being the only refractive optical elements between the subject being filmed and said prisms; and upper and lower rear lens systems on said upper and lower image paths for focusing upper and lower images onto the film plane of a camera.

5. The system of claim 4 wherein said prisms are fixed within said system housing.

6. The system of claim 5 wherein
said lens housing and said system housing have interengaging guides thereon directed parallel to said axes so that said lens housing and said negative acromatic lenses therein may be moved towards and away from said camera mounting means for focusing an object onto a film plane in a camera.

7. The system of claim 4 wherein an aperture stop holder is secured to said system housing adjacent said rearwardly directed faces of said prism, said aperture stop holder being for receiving an aperture plate having upper and lower spaced exposure controlled apertures therein, said aperture plate holder also being for receiving exposure control filters therein.

8. An optical system for attachment to a motion picture camera for 3-D motion picture filming comprising:
a system housing having a front and having first and second laterally spaced optical axes which lie substantially in a plane and extend from the front of said housing for directing at a subject, said housing having a rear, mounting means on the rear of said housing for mounting said housing on a camera;
first and second laterally spaced negative acromatic lenses on said axes, a lens housing, said first and second laterally spaced acromatic lenses being mounted on said lens housing, said lens housing being movably mounted on said system housing;
first and second rhomboid prisms, said first rhomboid prism having a face on said first laterally spaced axis and said second rhomboid prism having a face on said second laterally spaced axis, said first and second rhomboid prisms respectively having rearwardly directed faces positioned one above the other to define upper and lower image paths, said rhomboid prisms being notched adjacent each other to form adjacent notch faces on each prism, said notch faces lying substantially on the plane of said optical axes, said first and second laterally spaced negative acromatic lenses being the only refractive optical elements between the subject being filmed and said prisms; and upper and lower rear lens systems on said upper and lower image paths for focusing upper and lower images onto the film plane of a camera, said upper and lower rear lens systems being laterally movable with respect to said system housing to control convergence of the images on the film plane to control stereoptic separation.

9. The system of claim 8 wherein said upper and lower rear lens systems are respectively mounted on upper and lower convergence slides, said convergence slides being laterally movable with respect to said system housing to control lateral movement of said upper and lower rear lenses.

10. The system of claim 9 wherein a link is pivoted with respect to said system housing, said link having upper and lower control pins therein respectively engaging in said upper and lower convergence slides so that lateral motion of one of said convergence slides causes opposite lateral motion of the other of said convergence slides to oppositely laterally adjust said upper and lower rear lens systems.

11. The system of claim 10 wherein there is external convergence control means on said system housing connected to said convergence slides for controlling the lateral position of said convergence slides.

12. The system of claim 11 wherein said external convergence control means comprises a manually operable knob and a cam connected to said knob, said cam having a cam surface connected to position said convergence slides.

13. The system of claim 12 wherein a cam follower engages said convergence control cam and said cam follower engages one of said convergence slides so that manual control of said convergence control knob moves said cam follower to move said convergence slides.

14. The system of claim 13 wherein
said lens housing and said system housing having interengaging guides thereon directed parallel to said axes so that said lens housing and said negative achromatic lenses therein may be moved towards and away from said camera mounting means for focusing an object onto a film plane in a camera.

* * * * *